Figure 4:
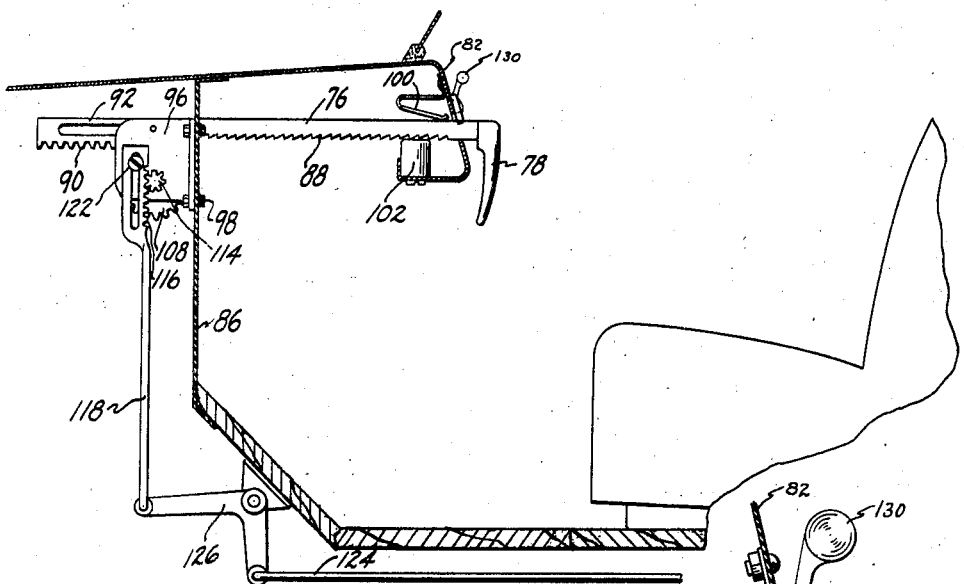

Dec. 1, 1942.  S. A. SNELL  2,303,586
BRAKE MECHANISM
Filed Feb. 1, 1939   4 Sheets-Sheet 1
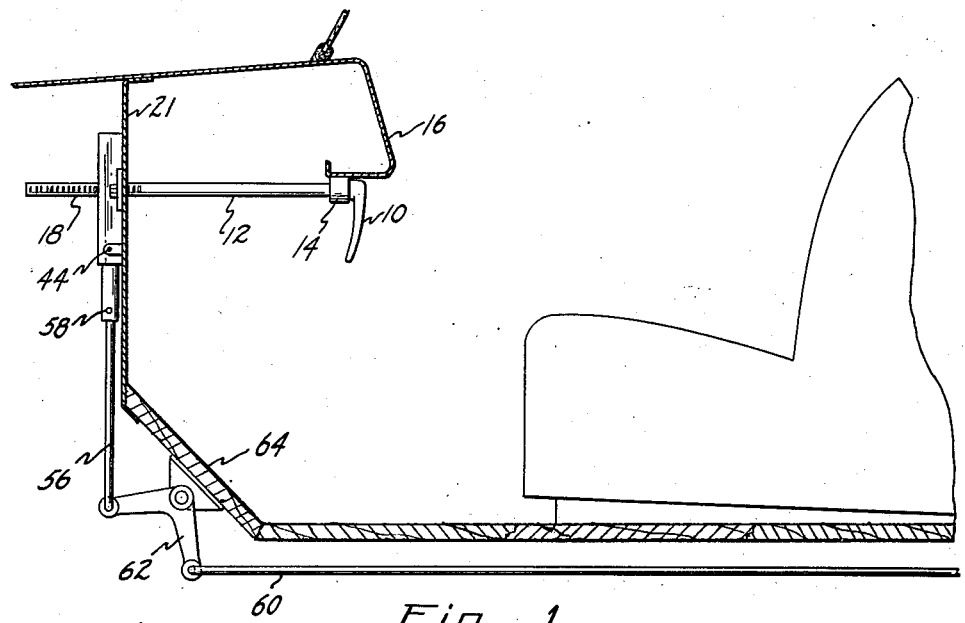
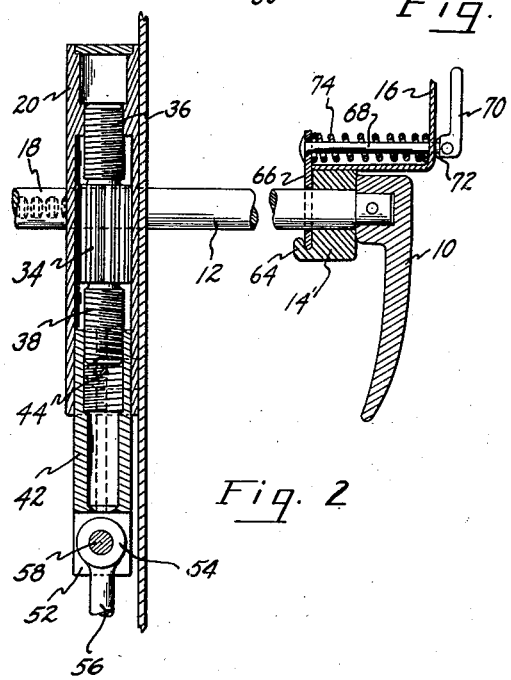
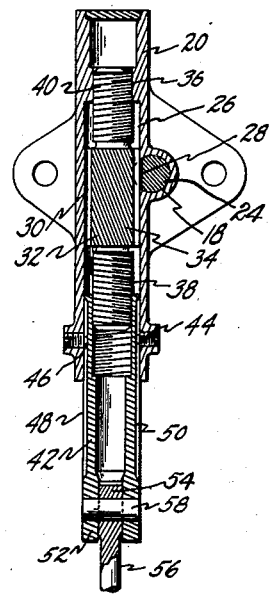
Inventor
SAMUEL A. SNELL
By Beaman & Langford
Attorneys Dec. 1, 1942.  S. A. SNELL  2,303,586
BRAKE MECHANISM
Filed Feb. 1, 1939  4 Sheets-Sheet 2

Inventor
SAMUEL A. SNELL
By Beaman & Langford
Attorneys

Dec. 1, 1942.  S. A. SNELL  2,303,586
BRAKE MECHANISM
Filed Feb. 1, 1939  4 Sheets-Sheet 3

Inventor
SAMUEL A. SNELL
By Beaman + Langford
Attorneys

Dec. 1, 1942.  S. A. SNELL  2,303,586
BRAKE MECHANISM
Filed Feb. 1, 1939  4 Sheets-Sheet 4
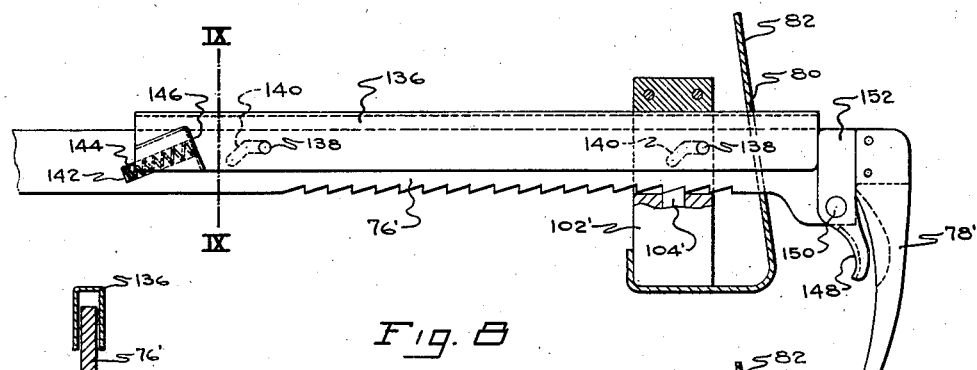
Fig. 8
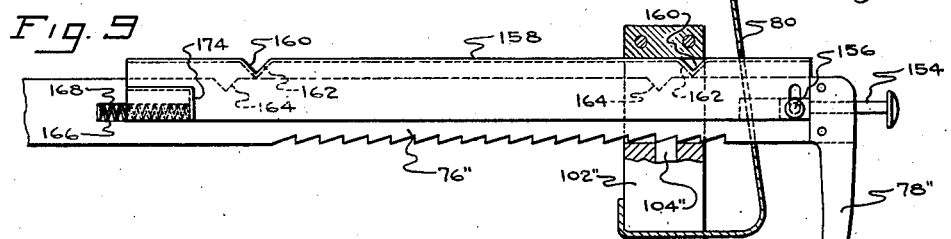
Fig. 9
Fig. 10
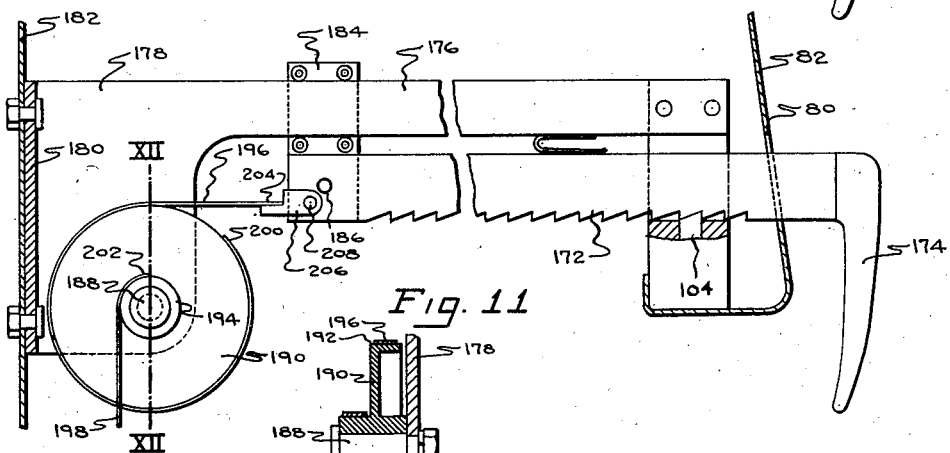
Fig. 11
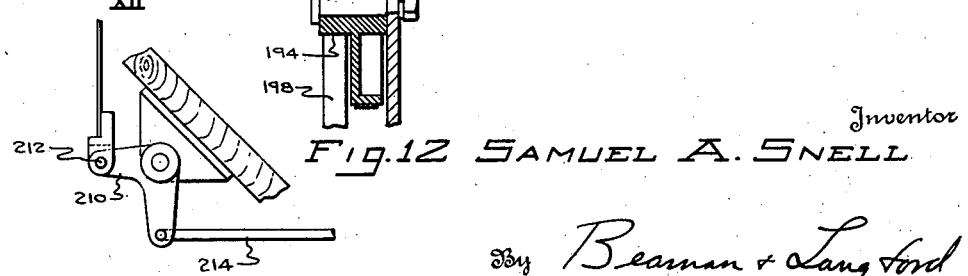
Fig. 12
Inventor
SAMUEL A. SNELL
By Beaman & Langford
Attorneys

Patented Dec. 1, 1942

2,303,586

UNITED STATES PATENT OFFICE 2,303,586

BRAKE MECHANISM

Samuel A. Snell, Jackson, Mich., assignor to Townsend F. Beaman, Jackson, Mich., trustee Application February 1, 1939, Serial No. 253,985

10 Claims. (Cl. 74—503)

The present invention relates to improvements in mechanical movements and the adapting of such improvements to brake mechanism particularly designed for automotive vehicles and for out of the way installation.

At the present time it is the practice to mount the manually actuated emergency brake lever with its pivotal point behind the instrument panel with the hand grip of the brake lever projecting slightly below the instrument panel so as not to interfere with the operator's leg room. The movement of the brake lever is transferred to the brake mechanism through a cable which extends forward through the dash and then rearwardly beneath the floor boards. In addition to the expense of this cable, the friction losses of the cable in its conduit are relatively high. Moreover, the required mechanical advantages can only be obtained through movement of the brake lever through a considerable arc which with a short lever necessitates the location of the hand grip of the brake lever in a released position out of the ready reach of the operator.

Thus it becomes an object of the present invention to provide improved brake applying mechanism which may be conveniently located and operated. In practice it will most likely be located directly beneath the instrument panel. However, it may be mounted for operation through the instrument panel or up through the floor board or other convenient location.

Another object is the provision of a new mechanical movement particularly designed to angularly transfer movement with mechanical advantage adaptable to brake mechanism but having general application in other fields.

Another object is to provide a brake operating device which embodies a rotatable unit for imparting different movement to associated movement transferring member.

A further object is to provide a novel brake applying mechanism in which the braking force is applied through a unit accomplishing differential movement which embodies a screw of self-locking pitch.

A still further object resides in a brake operating device embodying a rack and pinion means to transfer the brake applying force with mechanical advantage.

A still further object is to provide an improved emergency brake operating mechanism for automotive vehicles which in one form is self-locking in all positions of adjustment yet may be released without preliminary operation of any type of locking detent.

A still further object is to provide a brake operating mechanism having novel latching and releasing mechanism, one feature of which permits release without first increasing the braking force.

A still further object is a brake operating mechanism having a toothed locking portion associated with a portion of the mechanism having maximum movement with disengagement from the toothed portion being accomplished by movement of said portion in a direction other than brake applying.

Figures 5, 6:
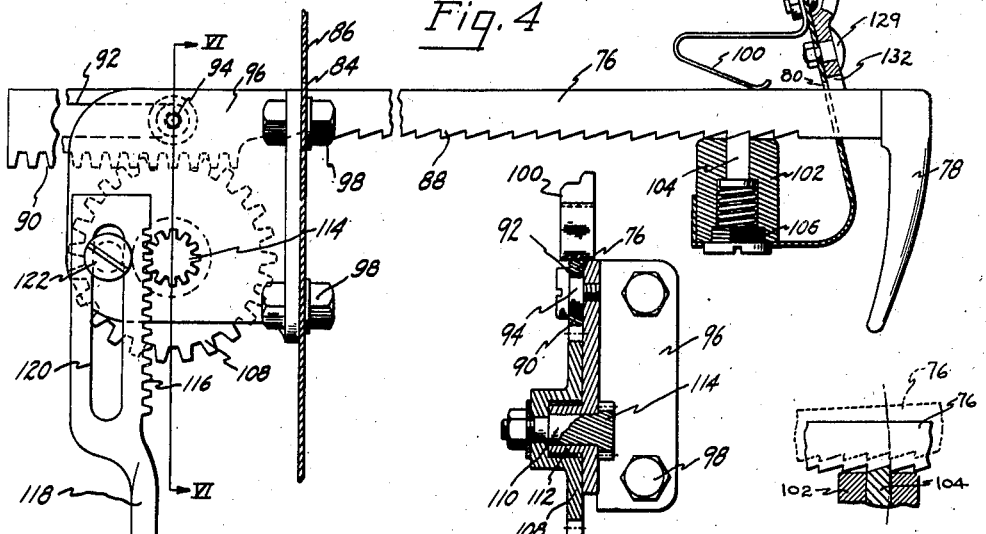
Figure 6A:
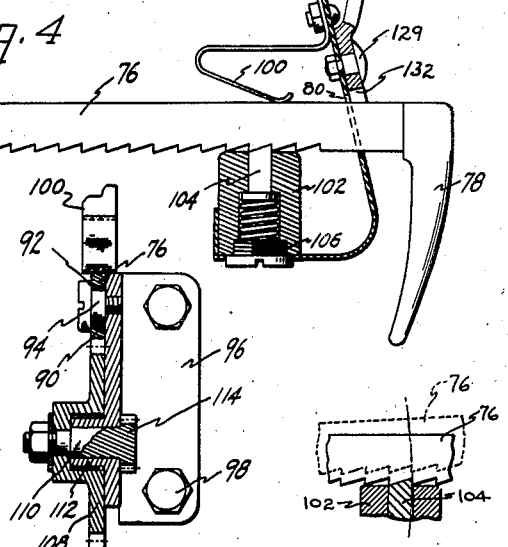
Figure 7:
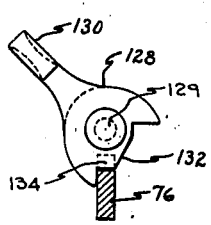
Figure 13:
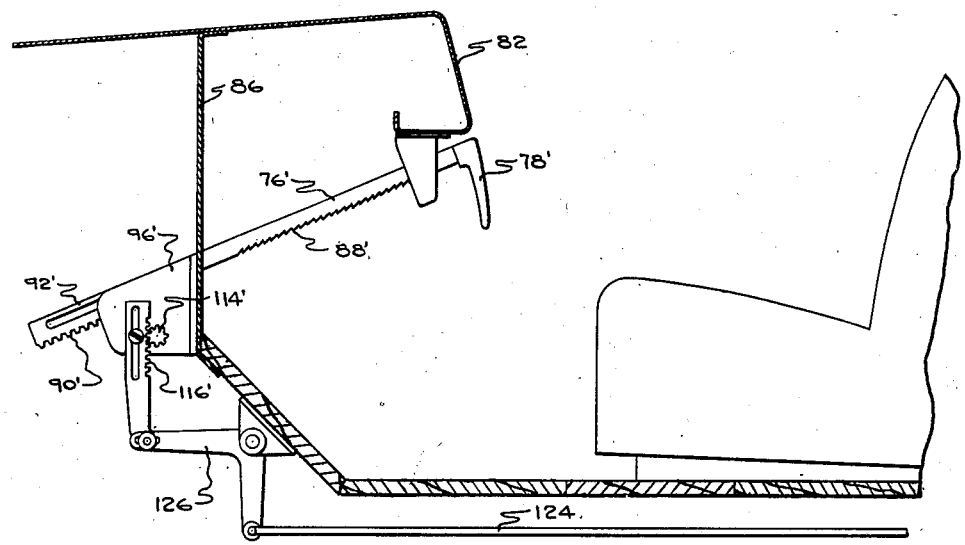
Figure 14:
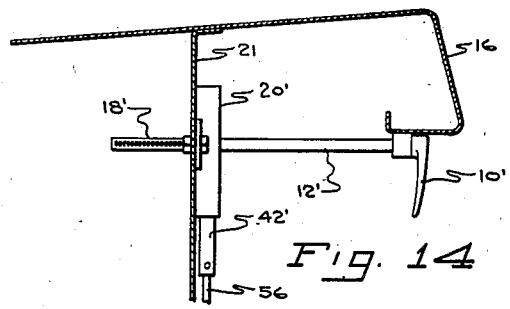

These and other objects and advantages residing in the arrangement, combination and construction of parts will more clearly appear from the detailed description and the appended claims when considered in connection with the accompanying drawings, wherein Fig. 1 is a sectional view through the driver's compartment of an automobile showing my improved brake operating mechanism installed, Fig. 2 is a fragmentary cross-sectional view of the brake operating mechanism of Fig. 1 with a locking feature added, Fig. 3 is a cross-sectional view through the screw and gear housing through a plane at right angles to the section shown in Fig. 2, Fig. 4 is a view similar to that shown in Fig. 1 of a modified form of the invention, Fig. 5 is an enlarged side elevational view of certain of the construction shown in Fig. 4, Fig. 6 is a cross-sectional view taken on line VI—VI of Fig. 5, Fig. 6A is a diagrammatic view showing the manner of release of the toothed portion from its locking detent, Fig. 7 is a front elevational view showing the locking dog in a locking position, Fig. 8 is a side elevational view of one form of brake locking structure, Fig. 9 is a cross-sectional view taken on line IX—IX of Fig. 8, Fig. 10 is a view similar to Fig. 8 of a further form of locking mechanism, Fig. 11 is a view similar to Fig. 5 of a modified unit for effecting mechanical advantage, Fig. 12 is a cross-sectional view taken on line XII—XII of Fig. 11, Fig. 13 is a view similar to Fig. 1 showing a push-pull brake operating member disposed in line with the natural arm movement of the driver, and Fig. 14 is a view similar to Fig. 1 showing the unit for effecting mechanical advantage mounted on the inside of the dash.

Referring to Fig. 1, a partial interior cross-sectional view of an automobile is shown illustrating one manner in which my improved brake mechanism may be installed. The hand grip 10 is shown pinned to a rod 12 which is supported for reciprocating movement in a guide 14 suitably mounted upon the instrument panel 16. In practice the aforesaid brake parts may extend through the instrument panel, beneath or to one side, on either side of the driver, or otherwise suitably located so as to be readily accessible. The outer end of the rod 12 is in the form of a rack 18 and may extend through a suitable opening in the dash 21.

Bolted or otherwise suitably secured to the front side of the dash 21 is a housing 20 which is shown as a casting but may be of sheet metal or other inexpensive construction. The rack portion 18 of the rod 12 passes through the housing 20; being guided in the bore 24 having a side opening into the bore 26 to enable the teeth 28 of the rack 18 to mesh with the teeth 30 of the pinion and screw unit 32. This unit has a pinion portion 34 and upper and lower screw portions 36 and 38, having left and right hand threads, respectively. The screw 36 is threaded into the housing 20 at 40 while the screw 38 is threaded into an axially moved nut 42 which is held against rotation by keys 44 and 46 operating in splines 48 and 50. The lower end of the nut 42 is forked at 52 to receive the eye 54 of the rod 56 held by the pin 58. The movement of the rod 56 is shown transferred to the rod 60 extending to the brakes through a suitable bell crank 62 supported from the floor boards 64.

The operation of the foregoing mechanism follows: When the operator pulls back on the handle 10, the rack 18 rotates the pinion 34. This causes the unit 32 to be screwed upwardly due to the threaded engagement of the screw 36 with the housing 20 at 40. At the same time the nut 42 has a compound upward movement which is a factor of both the bodily upward movement of the unit 32 and the pitch of the thread of the screw 38. The movement of the nut 42 is transferred to the brake through the rods 56 and 60. In practice the threads of the screws 36 and 38 are of the same pitch so that the movement of the nut 42 is twice that of the unit 32. It will be understood that the pinion 34 is of sufficient length to mesh with the rack 18 throughout its up and down movement in the bore 26. An efficient form of mechanical advantage may be conveniently obtained with the foregoing mechanism with minimum movement and applied force of and upon the handle 10. As the pitch of the screws 36 and 38 are of locking angles there is no need of auxiliary locking detents or other mechanism to hold the brakes applied. The releasing movement is merely a reversal of the braking applying movement above described.

Where an auxiliary lock is required for manipulation prior to effecting brake release, any one of the many arrangements may be employed in connection with my improvement in mechanical movement. As shown in Fig. 2, the guide 14' has a socket portion 64 with which a tiltable locking detent 66 engages. The detent 66 embraces the rod 12 with very slight clearance when in a vertical position. When rocked out of a vertical plane, the detent will grip the rod 12 preventing the movement in a brake releasing direction. A control rod 68 engages the upper portion of the detent 66 for holding the same in a vertical position, through a lever 70 pivoted therein and having an eccentric 72. When the lever 70 is rotated clockwise as viewed in Fig. 2, the eccentricity of the part 72 permits the rod 68 to be urged to the left under the stress of the spring 74 rocking the detent 66 into a cocked position in which it will frictionally grip the rod 12 preventing brake releasing movement.

In Figs. 4 to 6 there is shown a modified construction which possesses many of the features of that form of the invention illustrated in Figs. 1 to 3, inclusive. The rod 76 carrying the hand grip 78 extends through an opening 80 in the instrument panel 82 as well as through a suitable opening 84 in the dash 86. As shown, the rod 76 is provided with a toothed portion 88 at one end, a rack portion 90 at the other, and a guide slot 92 in which a guide pin 94 rides carried by the bracket 96 bolted to the front side of the dash 86 by suitable bolts 98. A spring 100 acting upon the top to the rod 76 holds the same in contact with the block 102 carrying a detent 104 urged by the spring 106 into the position shown in Fig. 5. The detent will engage with the toothed portion 88 of the rod 76 to hold the latter in braking applied position. The opening 80 is sufficiently larger than the rod 76 to enable the rod 76 to be slightly lifted through the grip 78 to clear the detent 104 to release the brakes; the rod 76 rocking about the axis of the pin 94 operating in the slot 92. The gear 108 is carried on a shoulder bolt 110 supported in a suitable bearing 112 in a bracket 96 and having a small gear 114 aligned therewith. The gear 108 may be suitably keyed to the bolt 110 so the gears 108 and 114 may be positively rotated. A rack 116, carried by a rod 118 and having a guide slot 120 in which the guide pin 122 upon the bracket 96 rides, meshes with the small gear 114. In practice the gears 108 and 114 having a tooth ratio give a four to one mechanical advantage. The operation of the above mechanism to apply and release the brakes through the brake rod 124 shown connected to one end of the bell crank 126 to which the rod 118 is connected, is thought to be obvious.

In conventional pivoted brake levers, wherein a releasable dog engaging a toothed segment located adjacent the pivotal axis of the lever is employed to lock the brake lever in its positions of adjustment, it is not possible to locate the teeth on the segment sufficiently close together to enable the dog to be conveniently moved from one tooth to another as the lever approaches the position in which the brakes are fully applied. By arranging the teeth 88 upon the rod 76 which will have four times the movement of the rod 118, with a four to one mechanical advantage, teeth located a quarter of an inch apart will only necessitate movement of the rod 118 of one-sixteenth of an inch. This enables the brake to be fully applied without the necessity of having to apply excessive force to the brake lever in order to bring the dog into engagement with a particular tooth in order to fully apply the brakes. Also the tooth load is reduced to one-fourth the brake applying load. As more clearly shown in Fig. 6A, the illustrated construction has the further advantage that the releasing movement of the rod 76 necessitates no appreciable axial movement of the rod 76 in a brake applying direction and thus can be accomplished with little effort.

To prevent accidental release of the brake operating device shown in Figs. 4 and 5, a locking dog 128 is shown pivoted at 129 upon the panel 82. When the handle 130 is in the position of Fig. 5, the rod 76 may be raised to clear the dog 104. With the handle 130 rocked into the position of Fig. 7, the portion 134 will be disposed over the rod 76 preventing the same from being raised to release the brake.

In Figs. 8 and 10 are illustrated two similar forms of mechanism for automatically locking the brake operating device against accidental release in any position of adjustment; the locking mechanism being such that two separate and distinct operations are necessary in order to effect brake release. Referring to Fig. 8 an inverted U-shaped bar 136 is carried upon the brake rod 76′ corresponding to 76 of Fig. 4, as more clearly shown in Fig. 9. Pins 138 mounted in the bar 136 ride in angular slots 140 in the rod 76′. A spring 142 is mounted in a slot 144 in the rod 76′ and bears against a shoulder 146 of the bar 136 to urge the bar 136 into the elevated position shown in Fig. 8. In this position the rod 76′ and bar 136 substantially fill the opening 80 in the dash 82 preventing the rod 76′ from being raised through the hand grip 78′ to clear the locking dog 104′ in the manner described with reference to the rod 76 shown in Fig. 5. A trigger 148 pivoted at 150 on the rod 76′ has an upper end 152 which acts against the bar 136 to move the same to the left as viewed in Fig. 8. Relative movement between the rod 76′ and bar 136 will result in the bar 136 being lowered due to the pin and slot connections 138 and 140 to lower the bar 136 enabling the rod 76′ to be elevated in the slot 80 to clear the dog 104′. From the foregoing description, it will be understood that in all positions of adjustment of the rod 76′ it will be necessary to lower the bar 136 through manipulation of the trigger 148 as well as to lift the rod 76′ to clear the dog 104′ before it is possible to release the brake.

In Fig. 10 the brake rod 76″ has a handle 78″ through which extends an axially actuated release button 154 having pin and slot connections at 156 with the locking bar 158 corresponding in general construction with the bar 136. As shown the bar 158 which is of inverted U-shape cross-section is formed at 160 with depressed portions 162 having oppositely sloping sides adapted to ride into and out of similar shaped notches 164 along the upper surface of the rod 76″. The rod 76″ is shown slotted at 166 to receive a spring 168 which acts against shoulder portions 174 of the bar 158 to urge the same into the position shown in Fig. 10. When the push button 154 is moved to the left, as viewed in Fig. 10, by the operator's thumb, the bar 158 will axially slide upon the rod 76″ and will be lowered at the time the portions 162 are brought into alignment with the notches 164. With the bar 158 in the position shown in Fig. 10, the portions 162 will ride upon the top of the rod 76″ preventing the rod 76″ from being raised clearing the dog 104″ due to the fact that there is insufficient clearance between the combined width of the rod 76″ and bar 158 to enable the rod 76″ to be raised in the slot 80 of the panel 82.

In Figs. 11 and 12 is shown a form of the invention quite similar to that disclosed in Fig. 5 except for the fact that the rack and pinion have been replaced by flexible bands rolling upon cylindrical portions of different diameters as shown, the brake rod 172 has a handle portion 174 extending through a slot 80 in the panel 82. A track portion 176 is shown supported from a bracket 178 secured through a flange 180 to the inside of the dash 182. Mounted upon the track portion 176 is a trolley 184 which pivotally supports one end of the rod 172 at 186. Supported for rotation upon an axis 188 is a rotatable member 190 having cylindrical portions 192 and 194 of a different diameter. Steel bands or other suitable flexible members 196 and 198 have their ends 200 and 202 silver soldered or otherwise connected to their respective cylindrical portions. The opposite end of the band 196 is silver soldered at 204 to a connector 206 secured to the rod 172 at 208. Movement of the rod 172 to the right as viewed in Fig. 11 will unwind the band 196 from its cylindrical portion 192 while at the same time winding the band 198 about its cylindrical portion 194. The winding up of the band 198 rocks the bell crank 210 to which one end of the band 198 is connected at 212; the bell crank 210 in turn being connected to the rod 214 extending to the brake mechanism. The latching and releasing of the brake rod 172 may be the same as that disclosed in Fig. 5. The construction of Fig. 11 may be very inexpensively manufactured for the reason that the rotary part 190 may be fabricated as a single stamping in addition to being able to use bands 196 and 198 instead of racks. It will be understood that the usual spring means (not shown) for releasing the brake mechanism will maintain a tension upon the bands 196 and 198 at all times.

In the disclosure, as a matter of convenience, the brake rod to which the hand grip is connected has been illustrated as passing through a slot of limited width in the instrument panel. It is to be understood that in practice the brake rod and grip will in most cases be located below the instrument panel with the clutching and releasing mechanism as well as the guiding structure for the brake rod carried by a separate bracket attached to the instrument panel, steering column, or other suitable supporting structure.

The gear teeth of forms of the invention of Figs. 4 to 6, as well as the surfaces upon which the bands 196 and 198 wind up, are all defined upon arcs of circles. Upon rotation, a substantially constant differential in mechanical advantage is obtained through the range of brake application which is not varied by brake adjustment or take up. It is anticipated, however, and considered within the scope of the present invention to lay out the teeth of the gear or the surface upon which the flexible band rolled upon a convolute or other surface so as to obtain an increase or decrease in mechanical advantage during the range of brake application.

Because of the practical desirability of employing relatively small parts in the fabrication of my brake operating device, the rotary unit shown in the several forms of the invention for effecting mechanical advantage will be rotatable through 180° or more in order to have approximately two inches of take up movement for brake application. In truck brakes where a six to one or greater ratio of mechanical advantage may be desired, a complete rotation or even more may be necessary. This is one of the distinguishing features of the present invention over the use of a bell crank of different arm lengths for obtaining mechanical advantage. In the annexed claims, the reference to a rotary unit is intended to define over such construction. Also in the claims the term "geared" has been used to define all forms of connection between a rotated part and a part driving the rotated part or driven thereby or having movement otherwise imparted thereto or thereby.

Having thus described my invention, what I claim as new and desire to protect by Letters Patent is:

1. In combination with the driver's compartment of a vehicle having a space for the driver's legs, of brake operating means located in the outlining structure of said space, said means comprising a mounting structure, a rotatable unit supported on said structure for rotation, a brake actuator having a hand grip, means supporting said actuator for substantially horizontal movement, means gearing said actuator to one part of said unit to rotate the same, a member for imparting operating movement to the brake geared to another part of said unit having differential movement relative to said first part, said member upon rotation of said unit having substantially vertical linear movement.

2. In the combination as set forth in claim 1, wherein said unit is disposed for rotation through substantially 180° or more to transfer movement with a substantial constant ratio of mechanical advantage.

3. In combination with an automotive vehicle having a dash, an instrument panel forward of the dash, and floor structure defining with said dash and panel leg room for the operator, of brake operating mechanism supported clear of said floor structure, said mechanism comprising a hand grip supported in brake released position at approximately the level of said panel and in substantially the vertical plane thereof, a member to which said grip is connected at one end forward of said dash, means supporting said member for push-pull operation in substantially a horizontal plane, a mounting structure, a motion reducing rotatable unit for effecting mechanical advantage mounted in said structure adjacent said dash, the other end of said member being geared to said unit to rotate the same upon linear movement of said hand grip, and motion transferring means for actuating the brake operatively connected to said unit at one end for differential movement in a vertical plane contiguous with the plane of the dash to clear said floor structure.

4. In a brake operating device, a mounting structure, a unit for transferring movement with mechanical advantage supported in said structure, said unit including a rotated part, a part actuated by rotation of said part with reduced movement, a manually moved part geared to said rotated part for rotating the same upon axial movement of said manually moved part, and a connection for operating the brakes, attached to said part having reduced movement and axially moved thereby upon rotation of said rotated part.

5. In a brake operating device, an operating member moved from one position to another to transmit movement, dogging structure for holding said operating member in different positions of adjustment, means supporting said operating member for bodily movement clearing said dogging structure including an aperture in which said operating member is raised in clearing said dogging structure, and selectively operating means projecting into said aperture for reducing the raising movement of said operating member when in one position preventing movement of said operating member to clear said dogging structure.

6. In a brake operating device, the combination of a manually operated member for applying and releasing the brakes, means for supporting said member for movement in a direction applying the brakes, releasable means locking said member in a brake applied position, means in which said member is supported for vertical bodily movement to release said locking means, and additional selectively operated means for preventing vertical bodily movement of said member to release said first locking means.

7. In a brake operating device, a manually actuated member for applying and releasing the brakes, means locking said member in various positions of adjustment applying the brakes, supporting means for said member, including means supporting said member for lifting movement in a direction releasing said locking means, and safety latch mechanism requiring a separate operating motion for preventing lifting movement of said member to release said first locking means with said safety latch mechanism in an operative position.

8. In a brake operating device, a manually actuated member for applying the brakes, means supporting said member for axial movement to apply the brake, clutching means for holding said member in brake applying position, means supporting said clutch means and member for relative declutching movement in a vertical direction, and safety latch structure continuously urged into a position holding said means and member against relative declutching movement, and selectively operated means for moving said latch structure in a horizontal direction to an inoperative position.

9. In a brake operating device, a manually actuated member for applying the brakes, a structure in which a member is supported and guided for axial movement to apply the brakes, a part limiting the bodily transverse movement of said member, a latch for holding said member in positions of axial movement, said member being supported for transverse movement to clear said latch to release the brakes, a safety latch supported upon said member and movable therewith, said safety latch being disposed between said member and said part in all positions of adjustment of said member, and means for selectively moving said safety latch from an operative position limiting transverse relative movement between said member and said part to an inoperative position enabling sufficient movement of said member to clear said first latch.

10. In combination, a rotary unit, mounting structure for said unit for supporting the same for rotation, said unit including a relatively wide driven gear, a screw fixed to and rotated by said gear, a fixed member into which said screw is threaded, a driven rack for meshing with said gear to rotate said screw, said rack being narrower than said gear to permit relative axial movement of said gear in sliding mesh with said rack, a member having support for movement at substantially right angles to the movement of said rack, and a connection between said member and said screw whereby said member has axial movement upon rotation of said gear.

SAMUEL A. SNELL.